United States Patent [19]

Lloyd et al.

[11] Patent Number: 4,502,987

[45] Date of Patent: Mar. 5, 1985

[54] METHOD OF CONTROLLING CRYSTALLITE SIZE IN NUCLEAR-REACTOR FUELS

[75] Inventors: Milton H. Lloyd, Oak Ridge; Jack L. Collins, Knoxville; Sam E. Shell, Oak Ridge, all of Tenn.

[73] Assignee: The United State of America as represented by The United States Department of Energy, Washington, D.C.

[21] Appl. No.: 426,365

[22] Filed: Sep. 28, 1982

[51] Int. Cl.$^3$ ............................................. G21C 21/02
[52] U.S. Cl. ...................................... 252/635; 264/0.5
[58] Field of Search ...................... 252/634, 635, 315.6, 252/315.7; 501/12; 264/14, 13, 0.5

[56] References Cited

U.S. PATENT DOCUMENTS

| | | | |
|---|---|---|---|
| 3,157,601 | 11/1964 | Fitch et al. | 252/634 X |
| 3,312,631 | 4/1967 | Smith | 252/635 |
| 3,714,056 | 1/1973 | Tallent | 252/634 |
| 4,397,778 | 8/1983 | Lloyd | 252/634 |

Primary Examiner—Teddy S. Gron
Assistant Examiner—Virginia B. Caress
Attorney, Agent, or Firm—Earl L. Larcher; Stephen D. Hamel

[57] ABSTRACT

Improved spherules for making enhanced forms of nuclear-reactor fuels are prepared by internal gelation procedures within a sol-gel operation and are accomplished by first boiling the concentrated HMTA-urea feed solution before engaging in the spherule-forming operation thereby effectively controlling crystallite size in the product spherules.

5 Claims, 1 Drawing Figure

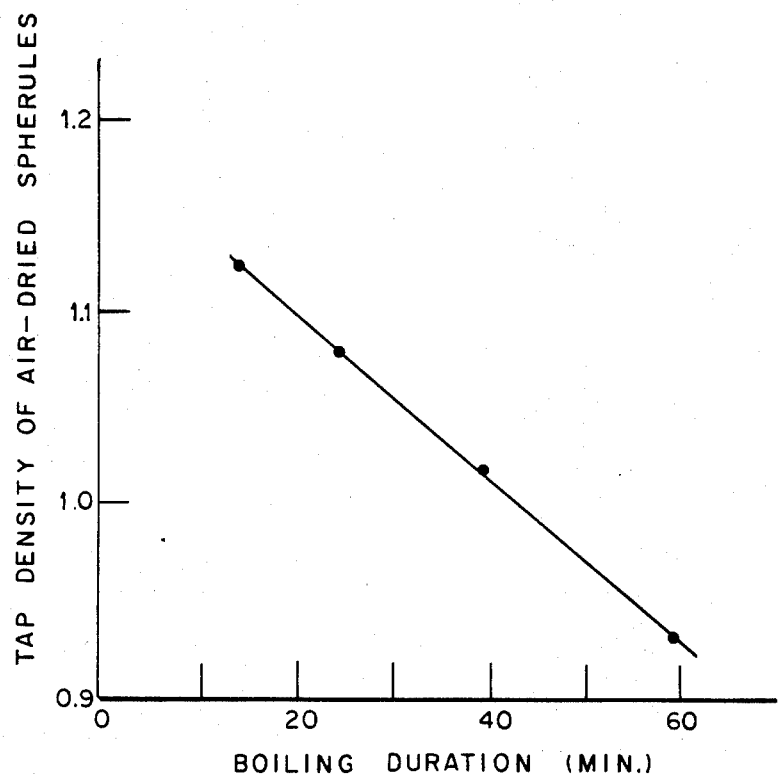

METHOD OF CONTROLLING CRYSTALLITE SIZE IN NUCLEAR-REACTOR FUELS

BACKGROUND OF THE INVENTION

This invention was made as a result of a contract with the United States Department of Energy and relates generally to a method of controlling crystallite size in nuclear reactor fuel spherules prepared by an internal gelation process. The product spherules are suitable for subsequent use in nuclear reactors wherein the fuel elements are loaded by vibration-packed or gel-derived-pellet technologies.

A commonly assigned and copending U.S. patent application Ser. No. 223, 547(79), now U.S. Pat. No. 4,397,778, filed Jan. 9, 1981, by Milton H. Lloyd, and entitled "Co-Processed Nuclear Fuels Containing (U,Pu) Values as Oxides, Carbides, or Carbonitrides", describes a method for coprocessing nuclear fuels in a secure and diversion resistant manner. According to that method, uranium, selected fission products, and plutonium constituents of a product stream from a nuclear reprocessing facility are first stabilized by maintenance of the stream in excess of 0.5 M $HNO_3$ concentration. Then, the stabilized stream is concentrated by vacuum distillation while being maintained at about 40° C. and a pressure of about 10 to 40 Torr. Thereafter, the stream is made acid deficient by neutralization with a predetermined amount of ammonium hydroxide. Finally, the acid-deficient stream is fed to a spherule-forming operation employing an internal gelation process to produce sol-gel spherules. Inasmuch as many of the operational details and conditions of the method described in assignee's copending patent application may be utilized herein, it is incorporated herein by reference.

In the practice of the invention of the aforementioned patent application, it was discovered that the crystal morphology of the precipitated phase, or phases, during spherule-forming operations could provide a crucial process parameter for control of numerous product qualities, such as density and the like. While this discovery was first made in pure urania systems of a single phase, the problem was found to be greatly exacerbated in mixed-fuel systems of uranium and plutonium involving complex phases. Because mixed-fuel systems have more utility in Liquid Molten Fuel Breeder Reactor (LMFBR) and like reactors, there is a need for a method of controlling the phenomena of crystallite size, and hence crystal morphology, in nuclear-reactor fuel spherules. To date, however, the art has found that product qualities, and particularly density, have varied unexpectedly for reasons that cannot be readily explained or fully understood.

SUMMARY OF THE INVENTION

It is, therefore, an object of the present invention to provide an efficient method for optimizing crystallite growth during spherule-forming operations by an internal gelation process to effect air-dried spherules of a tap density of about 1.0 g/cc which can effectively be pelletized into good quality ceramic pellets of 93 to 95% theoretical density.

It is another object of this invention to provide spherules of urania-plutonia mixtures whereby crystallite size is effectively controlled within a range suitable for preparation of the gel-derived-pellet form of nuclear reactor fuels.

These objects and other advantages of the invention may be ascertained by reference to the following disclosure and are provided in an improved method for preparing internally gelated spherules via a solgel process wherein a concentrated HMTA-urea solution is employed in spherule-forming operations. The improvement in the method comprises the step of heat-treating the hexanethylene-tetramine(HMTA)-urea solution for a sufficient duration without causing excessive urea decomposition prior to conducting spherule formation. Excessive urea decomposition occurs if the HMTA-urea feed is boiled for too long a duration which adversely affects the feed broth stability at 0° C. Uranium will precipitate when an HMTA-urea solution is mixed with the metal feed even at 0° C.

The teachings in the aforementioned copending patent application disclose that concentrated feed solutions of HMTA and urea employed in a spherule-forming operation of an internal gelation process should be prepared at about ambient temperature, or even be chilled down to about 0° C., because of the inverse temperature-solubility relationship of HMTA. However, it has been found that this previously disclosed procedure is less desirable because it restricts the formation of large urania crystallites and thereby prevents the formation of low density microspheres.

It has been found more advantageous, according to the present invention, to heat-treat the HMTA-urea solutions by boiling for a sufficient duration and then cool the resultant solution to about ambient temperature before admixture with a solution of metals selected from the group consisting of uranium, plutonium, thorium, and mixtures thereof for subsequent spherule formation by passage through a formation nozzle. Heat-treated solutions of the present invention are preferable over those of the aforementioned patent application because they allow for the preparation of microspheres over a wide range of sphere densities in a controlled manner.

BRIEF DESCRIPTION OF THE DRAWING

The single FIGURE is a graphical depiction of the tap density of air-dried spherules as a function of the boiling duration of the heat treatment performed in accordance with the method of the present invention on the feed solution of HMTA-urea to be deployed in an internal gelation process.

DETAILED DESCRIPTION

Spherules of enhanced product quality containing mixtures of uranium, plutonium, thorium, and mixtures thereof are derived by control of the crystallite size of the phases therein by heat treatment of the HMTA-urea feed solution to be used in the formation of the spherules. The product spherules are suitable for formation of nuclear-reactor fuels capable of being directly loaded into fuel elements by vibration-packed or gel-derived-pellet technologies. Preferably, it has been found that high density spherules with small crystallites make the best vibra-packed fuel forms and that moderate density spherules with large crystallites make the best gel-derived-pellet fuel forms.

The method of the present invention is directed to the optimization of crystallite growth in mixed-fuel spherules of nuclear-reactor fuels and is effected by heat treating the concentrated HMTA-urea feed solutions. Basically, three steps are combined in the heat-treating procedure. The first step comprises heating the feed solution to boiling, i.e., about 104° C., within about thirty minutes. The second step comprises maintaining this boiling temperature for a sufficient duration without causing excessive urea decomposition. Heating the solution to a temperature less than boiling will not provide the desired control of the crystallite size. The third step comprises cooling the boiled solution from boiling down to about ambient temperature. Preferably, the heating step takes place within about thirty minutes so that the solution is taken very rapidly from about ambient temperature to boiling. Typically, the duration at which the solution then boils will vary according to the desired end use of the product spherules and will normally be in the range of about 0 to 60 additional minutes yielding a total heating and boiling duration of about 30 to 90 minutes. The shorter durations are preferred for denser spherule formation, hence, the vibra-packed fuels, while the longer durations are preferred for the moderately dense spherules. Total durations for heating and boiling of much below about 30 minutes accomplish little or no benefit and total durations in excess of about 90 minutes are unnecessary to cause the desired effect and may result in excessive urea decomposition.

The third step of the heat-treating procedure comprises cooling the resultant solution in about 30 to 40 minutes to approximately ambient temperature, i.e., 25° C.±5° C. before mixing with the metal solution. It has been found that the heat-treatment, or boiling-cooling procedure, of this invention significantly and beneficially effects the control of the crystallite size of the phase or phases present in the resultant air-dried spherules.

For example, crystallites of about 1200 Å to 3000 Å may be derived in urania-plutonia spherules (Pu/U+Pu=0.25), by simply heating and boiling the HMTA-urea feed solution for about 90 minutes. The resultant spherules have been found to have a tap density of about 0.92 g/cc and are especially suited for forming gel-derived pellets of about 93 to 95% theoretical density. Micrographic examination of such pellets have revealed good-quality ceramic pellets characterized by the absence of visible voids and defects or structural remnants of the spherules. In comparison, urania-plutonia spherules prepared without heat treatment of the HMTA-urea feed solution have been found to be characterized by crystallites within the range of about 500 Å to 1400 Å and by high tap densities of about 1.31 g/cc. Pellets prepared from these denser spherules were of about 84% theoretical density. Since 88% theoretical density is considered to be the absolute minimum density for loadable fuel pellets for nuclear-reactor applications, heat-treated spherules prepared herein are more suitable for making gel-derived-pellet fuel forms.

EXAMPLE

In a series of experiments, the effect of heat treatment on HMTA-urea feed solutions provided to an internal gelation process was evaluated. Spherules were tailored within a range of HMTA-urea preparations to establish the relationship between duration and extent of heat treatment as well as ultimate calcined pellet density.

The first experiment was designated a control test wherein the HMTA-urea feed solution was not heat-treated prior to deployment in spherule forming operations of the aforementioned copending patent application of assignee. The prepared spherules were found to have a tap density of about 1.29±0.02 g/cc after air drying at 110° C. Electron micrographs of specimens of these high-density spherules revealed a large population of crystallites within the size range of about 500 Å to 1400 Å with a maximum urania crystallite size of about 1500 Å. Sintered pellets prepared from these spherules were not of good ceramic quality and were only of about 83.7% theoretical density. Micrographic examination of sections of these pellets revealed structural remnants of the pressed spherules which is undesirable.

In a second experiment, the HMTA-urea feed solution was heated to boiling (104° C.) in about thirty minutes but not maintained at that temperature for any duration. The prepared spherules were of about 1.24 g/cc tap density. Thus, little difference can be effected in spherule density by heat treatment of the feed solution without sustained boiling.

In each subsequent experiment, a 500 ml solution of 3.2M HMTA and 3.2M urea was heat treated under reflux conditions to the solution boiling point of about 104° C. for varying periods of measured time within the range of about 30 to 90 minutes and then rapidly cooled to about ambient temperature in about 30 minutes. A standard heat-up time of about thirty minutes to boiling was applied in each experiment so that only the actual time of boiling was varied. Thereafter, each HMTA-urea feed solution was combined with a solution containing a metal selected from the group consisting of uranium, plutonium, thorium, or mixtures thereof. The results of boiling durations as a function of sphere density are graphically depicted in the figure of the drawing. As demonstrated in the figure, the effect of heat treatment produces an almost linear function in spherule tap density with more boiling time producing spherules of lower densities.

When the feed solution was heat treated for about 40 minutes, the product spherules were found to have a tap density of about 1.04 g/cc which is much below that found in the first and second tests with no or only minimal heat treatment. Electron micrographs of these spherules revealed a large population of crystallites within the size range of about 1200 Å to 3000 Å with a maximum urania crystallite size of about 3000 Å. Sintered pellets prepared from these spherules appeared to be of good ceramic quality and of about 95.4% theoretical density. Visual examination of the microstructures of these pellets revealed no voids or defects and the complete absence of structural remnants from the pressed spherules.

From the foregoing, it can readily be concluded that tap density of air-dried spherules to be used in the manufacture of nuclear-reactor fuels may be varied within the range of about 1.31 to 0.92 g/cc by heat treating the HMTA-urea feed solution for a duration in the range of about 30 minutes to 90 minutes, respectively. By varying spherule tap densities within this range, the ultimate quality of the nuclear-reactor fuel form may be effectively determined.

In addition to a better understanding of the reasons for variant product qualities heretofore encountered in the art, the method of the present invention has the added advantages of providing greater process flexibility to the method described in the aforementioned copending application including the probability for commercial production of high plutonium content mixed fuels (Pu/U+Pu=0.35) in pellet form, a highly tolerant system for $NH_4NO_3$ present in nuclear fuel reprocessing streams which formerly required pretreatment for removal, and a simplified system with minimal reagent requirements for processing or waste treatment.

We claim:

1. An improved method for preparing internally gelated nuclear reactor fuel spherules via a sol-gel process wherein a concentrated hexamethylene-tetramine-urea solution is employed with a solution of metals selected from the group consisting of uranium, plutonium, thorium, and mixtures thereof in spherule-forming operations, the improvement comprising the step of heat-treating the HMTA-urea solution for a sufficient duration without causing excessive urea decomposition for effecting control of the crystallite size of phases present in the resulting spherules prior to the addition of the solution of metals and conducting of said spherule-forming operations.

2. The method of claim 1 wherein said sufficient duration is from about 30 to 90 minutes.

3. The method of claim 1 wherein the solution is heated from ambient temperature to boiling in about thirty minutes and maintained at the boiling temperature for up to about 60 minutes, and wherein the boiling solution is cooled to about ambient temperature within about 30 to 40 minutes.

4. The method of claim 3 wherein the boiling temperature is about 104? C.

5. An article produced by the method of claim 1 derived by internal gelation within a sol-gel process of a concentrated hexamethylene-tetramine-urea solution, said article characterized by boiling and cooling the HMTA-urea solution prior to engagement in said process.

* * * * *